US012664865B2

(12) United States Patent
Ramesh et al.

(10) Patent No.: US 12,664,865 B2
(45) Date of Patent: Jun. 23, 2026

(54) CONFIGURING THE APPEARANCE AND VISIBILITY OF ELECTRONIC DEVICES

(71) Applicant: Roku, Inc., San Jose, CA (US)

(72) Inventors: Sunil Ramesh, Saratoga, CA (US);
Mustafa Ozgen, Palo Alto, CA (US);
Robert Caston Curtis, Napa, CA (US);
Patrick Brouillette, Tempe, AZ (US);
Charles Brian Pinkerton, Boulder, CO
(US); Karina Levitian, Austin, TX
(US); Gregory Garner, Key Colony
Beach, FL (US)

(73) Assignee: Roku, Inc., San Jose, CA (US)

( * ) Notice: Subject to any disclaimer, the term of this
patent is extended or adjusted under 35
U.S.C. 154(b) by 53 days.

(21) Appl. No.: 18/676,177

(22) Filed: May 28, 2024

(65) Prior Publication Data

US 2025/0371954 A1     Dec. 4, 2025

(51) Int. Cl.
G08B 13/196     (2006.01)
H04N 7/18     (2006.01)
H04N 23/61     (2023.01)
H04N 23/695     (2023.01)

(52) U.S. Cl.
CPC ....... G08B 13/19632 (2013.01); H04N 7/181
(2013.01); H04N 23/61 (2023.01); H04N
23/695 (2023.01)

(58) Field of Classification Search
CPC .. G08B 13/19632; H04N 7/181; H04N 23/61;
H04N 23/695
USPC ................................................ 348/143, 151
See application file for complete search history.

(56) References Cited

U.S. PATENT DOCUMENTS

| | | | | |
|---|---|---|---|---|
| 9,175,930 B1* | 11/2015 | Pezeshkian | ............... | F41H 3/00 |
| 2004/0213982 A1* | 10/2004 | Touzov | ..................... | F41H 3/00 |
| | | | | 428/304.4 |
| 2007/0190368 A1* | 8/2007 | Jung | ......................... | F41H 3/00 |
| | | | | 709/224 |
| 2009/0079824 A1* | 3/2009 | Winsor | .................. | H04N 23/58 |
| | | | | 348/143 |
| 2014/0247478 A1* | 9/2014 | Bates | ......................... | F41H 3/02 |
| | | | | 432/92 |
| 2020/0109815 A1* | 4/2020 | Wilson | ................. | F16M 13/022 |
| 2024/0311900 A1* | 9/2024 | Onoe | ................. | G06Q 30/0639 |

FOREIGN PATENT DOCUMENTS

| | | |
|---|---|---|
| CN | 111541880 A | 8/2020 |
| JP | 2020021346 A | 2/2020 |
| JP | 7371764 B2 | 10/2023 |
| KR | 101810479 B1 | 12/2017 |

OTHER PUBLICATIONS

International Search Report and Written Opinion, dated Aug. 5,
2025, for the corresponding International Application No. PCT/
US2025/025133, 7 pages.

* cited by examiner

*Primary Examiner* — Asmamaw G Tarko
(74) *Attorney, Agent, or Firm* — Straylight LLP

(57) ABSTRACT

Disclosed herein are system, apparatus, article of manufac-
ture, method and/or computer program product embodi-
ments, and/or combinations and sub-combinations thereof,
for altering the appearance of electronic devices. An
example process can include obtaining a visibility configu-
ration for altering an appearance of an exterior surface of an
electronic device; and modifying at least a portion of the
exterior surface of the electronic device based on the vis-
ibility configuration.

20 Claims, 13 Drawing Sheets

800
OBTAIN A VISIBILITY CONFIGURATION FOR ALTERING AN APPEARANCE OF AN EXTERIOR SURFACE OF A FIRST ELECTRONIC DEVICE
802
MODIFY AT LEAST A PORTION OF THE EXTERIOR SURFACE OF THE FIRST ELECTRONIC DEVICE BASED ON THE VISIBILITY CONFIGURATION
804
FIG. 8

900

CAPTURE AT LEAST ONE IMAGE CORRESPONDING TO AN AREA THAT INCLUDES AN ELECTRONIC DEVICE
902

DETERMINE, BASED ON THE AT LEAST ONE IMAGE, A VISIBILITY CONFIGURATION FOR ALTERING AN APPEARANCE OF AN EXTERIOR SURFACE OF THE ELECTRONIC DEVICE TO OBFUSCATE VISIBILITY OF THE ELECTRONIC DEVICE WITHIN THE AREA
904

SEND THE VISIBILITY CONFIGURATION TO THE ELECTRONIC DEVICE
906

CAPTURE, BY AN IMAGE SENSOR, AT LEAST ONE IMAGE THAT INCLUDES AT LEAST ONE PERSON
1002

DETERMINE, BASED ON THE AT LEAST ONE IMAGE, THAT THE AT LEAST ONE PERSON IS AN UKNOWN PERSON
1004

DETERMINE, BASED ON THE AT LEAST ONE IMAGE, THAT THE UNKNOWN PERSON IS DIRECTING THEIR VIEW TOWARD THE IMAGE SENSOR
1006

CONFIGURING THE APPEARANCE AND VISIBILITY OF ELECTRONIC DEVICES

BACKGROUND

Field

This disclosure is generally directed to electronic devices such as camera sensors, and more particularly, to electronic devices having a configurable appearance that can be used, for example, to alter their visibility based on the surrounding environment.

SUMMARY

Provided herein are system, apparatus, article of manufacture, method and/or computer program product embodiments, and/or combinations and sub-combinations thereof, for modifying the appearance and/or visibility of electronic devices.

In some aspects, a method is provided for modifying the appearance of an electronic device (e.g., an IoT camera). The method can operate in the electronic device, in one or more computing devices (e.g., servers, mobile devices, IoT devices, etc.) that are communicatively coupled to the electronic device, and/or in a combination thereof.

The method can operate by obtaining a visibility configuration for altering an appearance of an exterior surface of an electronic device. In some cases, the method can further include modifying at least a portion of the exterior surface of the electronic device based on the visibility configuration.

In some aspects, a system is provided for modifying the appearance of an electronic device. The system can include one or more memories and at least one processor coupled to at least one of the one or more memories and configured to obtain a visibility configuration for altering an appearance of an exterior surface of the first electronic device. The at least one processor of the system can be configured to modify at least a portion of the exterior surface of the first electronic device based on the visibility configuration.

In some aspects, a non-transitory computer-readable medium is provided for modifying the appearance of an electronic device. The non-transitory computer-readable medium can have instructions stored thereon that, when executed by at least one computing device, cause the at least one computing device to obtain a visibility configuration for altering an appearance of an exterior surface of the first electronic device. The instructions of the non-transitory computer-readable medium can, when executed by the at least one computing device, cause the at least one computing device to modify at least a portion of the exterior surface of the first electronic device based on the visibility configuration.

BRIEF DESCRIPTION OF THE FIGURES

The accompanying drawings are incorporated herein and form a part of the specification.

FIG. 8 is a diagram illustrating a flowchart of an example method for configuring the appearance of an electronic device, according to some aspects of the present disclosure;

FIG. 9 is a diagram illustrating a flowchart of another example method for configuring the appearance of an electronic device, according to some aspects of the present disclosure;

In the drawings, like reference numbers generally indicate identical or similar elements. Additionally, generally, the left-most digit(s) of a reference number identifies the drawing in which the reference number first appears.

DETAILED DESCRIPTION

Electronic devices such as cameras, monitors, televisions, computers, speakers, etc. are used throughout the environment. In some cases, it may be desirable to alter the appearance of one or more electronic devices. For example, an electronic device may be unsightly or unaesthetic based on the location of the device or user preference. In another example, it may be desirable to conceal the location of an electronic device to prevent third parties from tampering with it. For instance, a user may wish to conceal the presence of a security camera that is used outside or inside the home to prevent unauthorized users from seeing and disabling it.

Provided herein are system, apparatus, device, method and/or computer program product embodiments, and/or combinations and sub-combinations thereof, for modifying the appearance of electronic devices. In some examples, an electronic device can have a housing or surface that includes a display or material that can be used to modify the appearance of the electronic device and/or to automatically adjust the appearance of the electronic device in response to the detection of some pre-determined condition. In one illustrative example, an electronic device may have a housing (e.g., case, cover, container, etc.) that includes one or more non-emissive displays (e.g., electronic ink displays) on one or more exterior surfaces of the housing. In another example, an electronic device may have a housing that includes one or more emissive displays (e.g., OLED, LED, etc.) on one or more exterior surfaces of the housing. In another example, an electronic device may include a housing that includes a material that can change in color or appearance such as an electrochromic material (e.g., color changing paint, chameleonic fabric, etc.), an electroluminescent material, any other type of material that can change appearance, and/or any combination thereof. In another example, an electronic device may include a housing that has at least one surface configured to display an image from a projective display.

In some cases, image data of an area that includes the electronic device can be captured and processed to determine an image, color, pattern, etc. that can be used to modify the appearance of the electronic device. For instance, in some applications a machine learning model can be used to process the image data and generate a visibility configuration that can be used to modify the appearance of the electronic device. In one example, the visibility configuration can include display data that can be presented on the exterior surface of the electronic device to make it blend in with its surroundings. In another example, the visibility configuration can include a color or a pattern that can be generated using a display and/or an electrochromic material such as a color changing paint.

Figure 1:
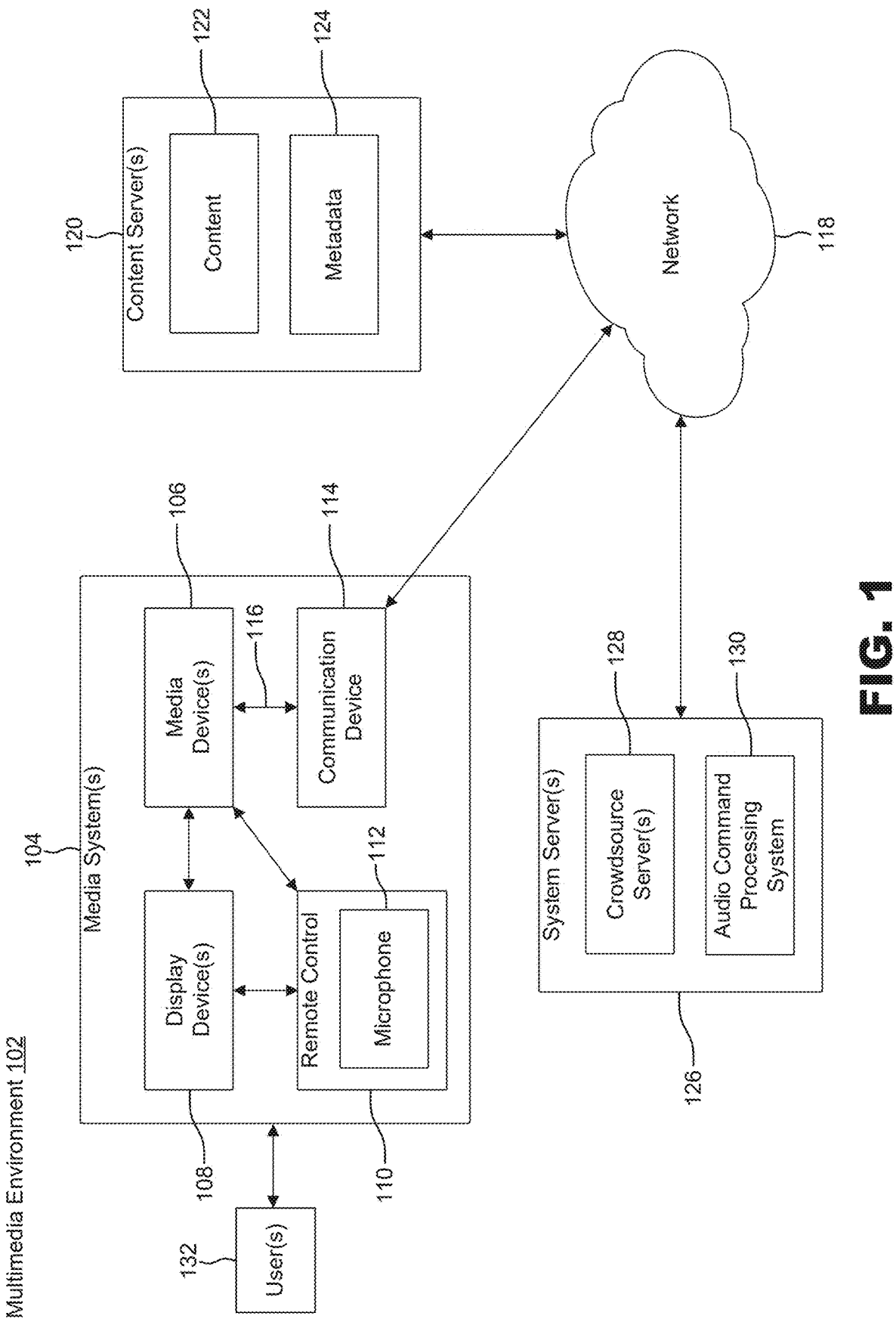
FIG. 1 illustrates a block diagram of a multimedia environment, according to some aspects of the present disclosure.

Various embodiments, examples, and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

In some aspects, the multimedia environment 102 may be directed to multimedia surveillance and/or security systems. For example, multimedia environment 102 may include media system 104, which could represent a house, a building, an office, or any other location or space where it is desired to implement a surveillance and security system with one or more sensors (e.g., a camera, a microphone, etc.) to monitor the surrounding environment. User(s) 132 may operate with the media system 104 to consume the multimedia data (e.g., content) captured/collected by the sensors of the surveillance and security system.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

In some examples, media device 106 may include one or more sensors implemented within a surveillance and security system such as a camera (or a security camera), a smart camera, a doorbell camera, an IoT camera, and/or any other type of image sensor that can be used to monitor and record the surroundings. The recording or live feed that is captured by such sensors can be sent to display device 108 such as a smartphone, computer, tablet, IoT device, etc.

Each media device 106 may be configured to communicate with network 118 via a communication device 114. The communication device 114 may include, for example, a cable modem or satellite TV transceiver. The media devices 106 may communicate with the communication device 114 over a link 116, wherein the link 116 may include wireless (such as WiFi) and/or wired connections. Alternatively, or in addition, media devices 106 may include one or more transceivers that can be configured to communicate directly with network 118 and/or with other media devices 106.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources). Although only one content server 120 is shown in FIG. 1, in practice, the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, recording or live feed from a surveillance and security system, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining to or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
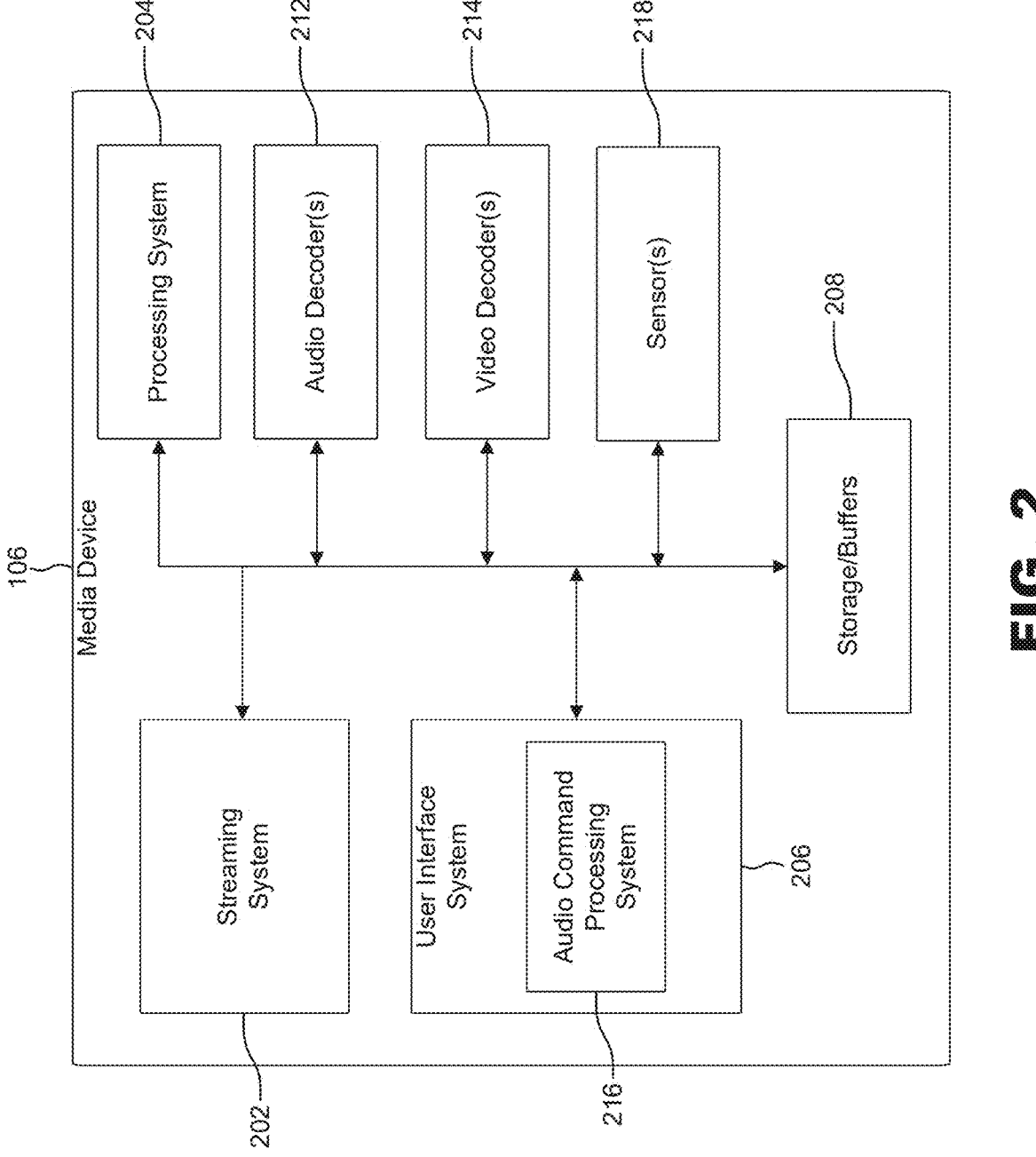
FIG. 2 illustrates a block diagram of a streaming media device, according to some aspects of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

The media device 106 may also include one or more sensors 218. Examples of sensors 218 include but are not limited to image sensors, accelerometers, gyroscopes, inertial measurement units (IMUs), light sensors, positioning sensors (e.g., GNSS), any other type of sensor, and/or any combination thereof. In one illustrative example, sensors 218 may correspond to an image sensor of an IoT camera that can be configured to capture image data and/or video data as part of a security surveillance system. In some examples, media device 106 may also include one or more light sources (not illustrated). For instance, media device 106 can include an infrared (IR) light source, visible light source, laser source, or the like.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Exemplary IoT Environment

Figure 3:
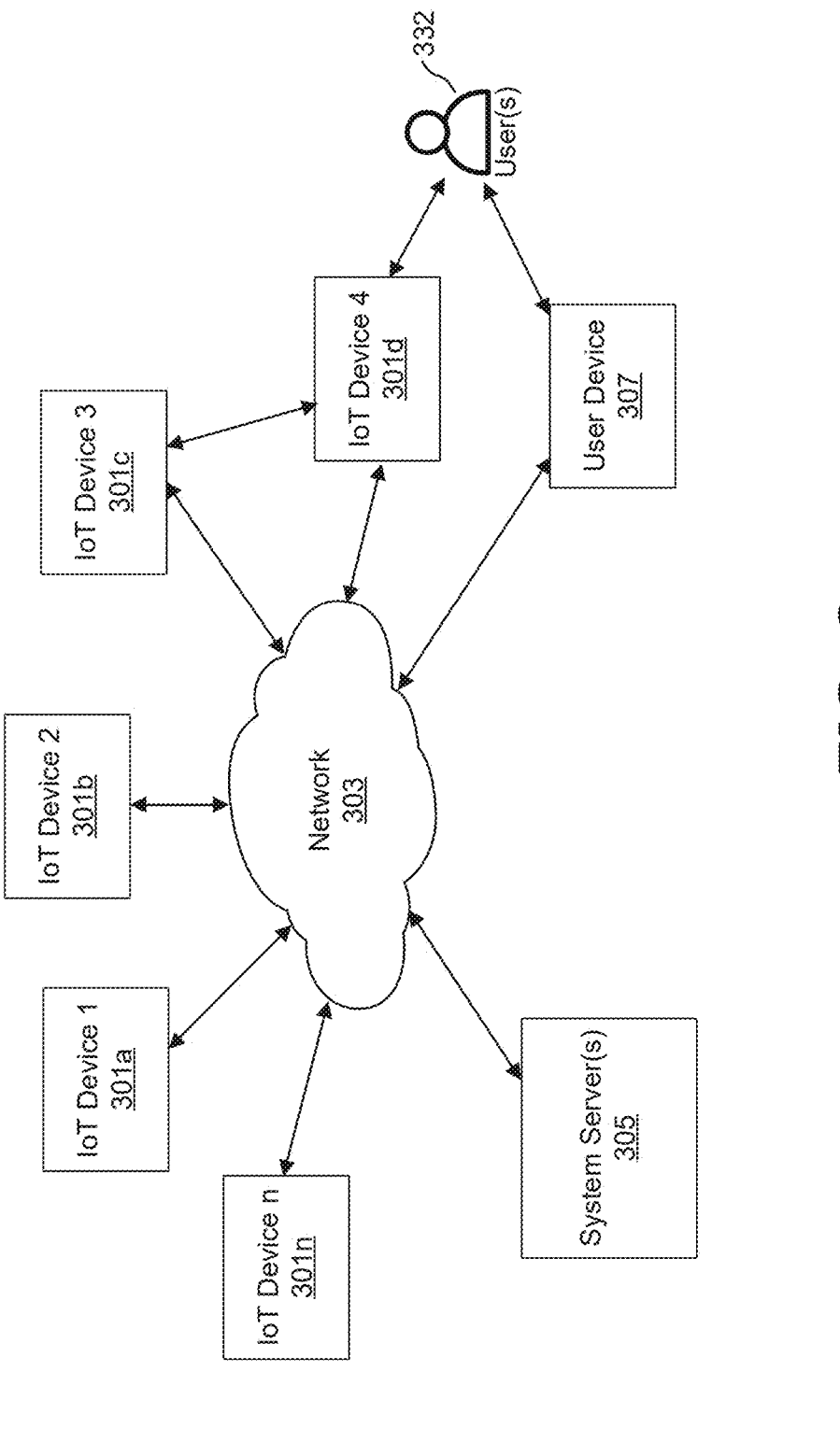
FIG. 3 illustrates a block diagram of an IoT environment, according to some aspects of the present disclosure.

FIG. 3 illustrates a block diagram of an IoT environment 300, according to some aspects of the present technology. According to some examples, IoT environment 300 can be implemented with multimedia environment 102 of FIG. 1. For example, multimedia environment 102 of FIG. 1 can be part of IoT environment 300 or vice versa.

In some cases, IoT environment 300 can include a plurality of IoT devices 301*a*-301*n* (collectively referred to as IoT devices 301), network 303, one or more system servers 305, and user device 307. According to some aspects, IoT devices 301 can be connected to, and communicate with, each other using a mesh network. In this example, when an IoT device leaves the plurality of IoT devices 301 and/or an IoT device is added to the plurality of IoT devices 301, the mesh network can be updated accordingly. In one illustrative example, network 303 can correspond to a mesh network connecting the plurality of IoT devices 301.

In some cases, the mesh network can be part of network 303. For example, IoT devices 301 can be connected to each other (e.g., communicate with each other) using the mesh network. The mesh network can be implemented using a wireless local area network (WLAN) such as WiFi. However, the present technology is not limited to this example, and the mesh network can be implemented using other types of wireless and/or wired networks. In some examples, network 303 can include the mesh network and another wireless and/or wired networks. In some aspects, network 303 can include, without limitation, mesh, wired and/or wireless intranet, extranet, Internet, cellular, Bluetooth, infrared, and/or any other short range, long range, local, regional, global communications mechanism, means, approach, protocol and/or network, as well as any combination(s) thereof.

In some configurations, IoT environment 300 can include one or more system servers 305. System servers 305 may operate to support IoT devices 301. In some examples, system servers 305 may operate to support IoT devices 301 from a cloud. It is noted that the structural and functional aspects of system servers 305 may wholly or partially exist in the same or different systems. According to some examples, IoT devices 301 can communicate with system servers 305 through network 303. In some instances, system servers 305 can be associated with system servers 126 of FIG. 1. For example, the structural and functional aspects of system servers 305 may wholly or partially exist in the same or different ones of the system servers 126.

In some instances, system servers 305 can include one or more user accounts associated with IoT devices 301 and/or their associated network 303. In a non-limiting example, IoT devices 301 can include IoT devices associated with a physical property of user 332 on one network 303. In this example, IoT devices 301 and network 303 can be associated with the user account of user 332.

IoT environment 300 can also include one or more user devices 307. In some aspects, user device 307 can be any of a personal digital assistant (PDA), desktop workstation, laptop or notebook computer, netbook, tablet, smart phone, smart watch or other wearable appliance, to name a few non-limiting examples, or any combination thereof. In some examples, user 332 can control and/or configure one or more IoT devices 301 using user device 307. For example, IoT device 301 can use radio frequency (RF) signals (e.g., WLAN) to receive configuration and/or control information from user device 307.

IoT devices 301 can include any IoT device. As some non-limiting examples, IoT devices 301 can include smart appliances such as, but no limited to, smart TVs, smart refrigerators, smart washers, smart dryers, smart dishwashers, smart ovens and gas tops, smart microwaves, smart heating, ventilation, and air conditionings (HVACs), smart fans, smart blinds, or the like. As other non-limiting examples, IoT devices 301 can include smart home security systems, smart locks, smart fire alarms/systems, or the like. IoT devices 301 can include sensors used in homes, offices, factories, medical sensors, fitness sensors/trackers, or the like. It is noted that although some aspects of this disclosure are discussed with respect to some exemplary IoT devices, the present technology is not limited to these examples and can be applied to other IoT devices.

Figure 4A:
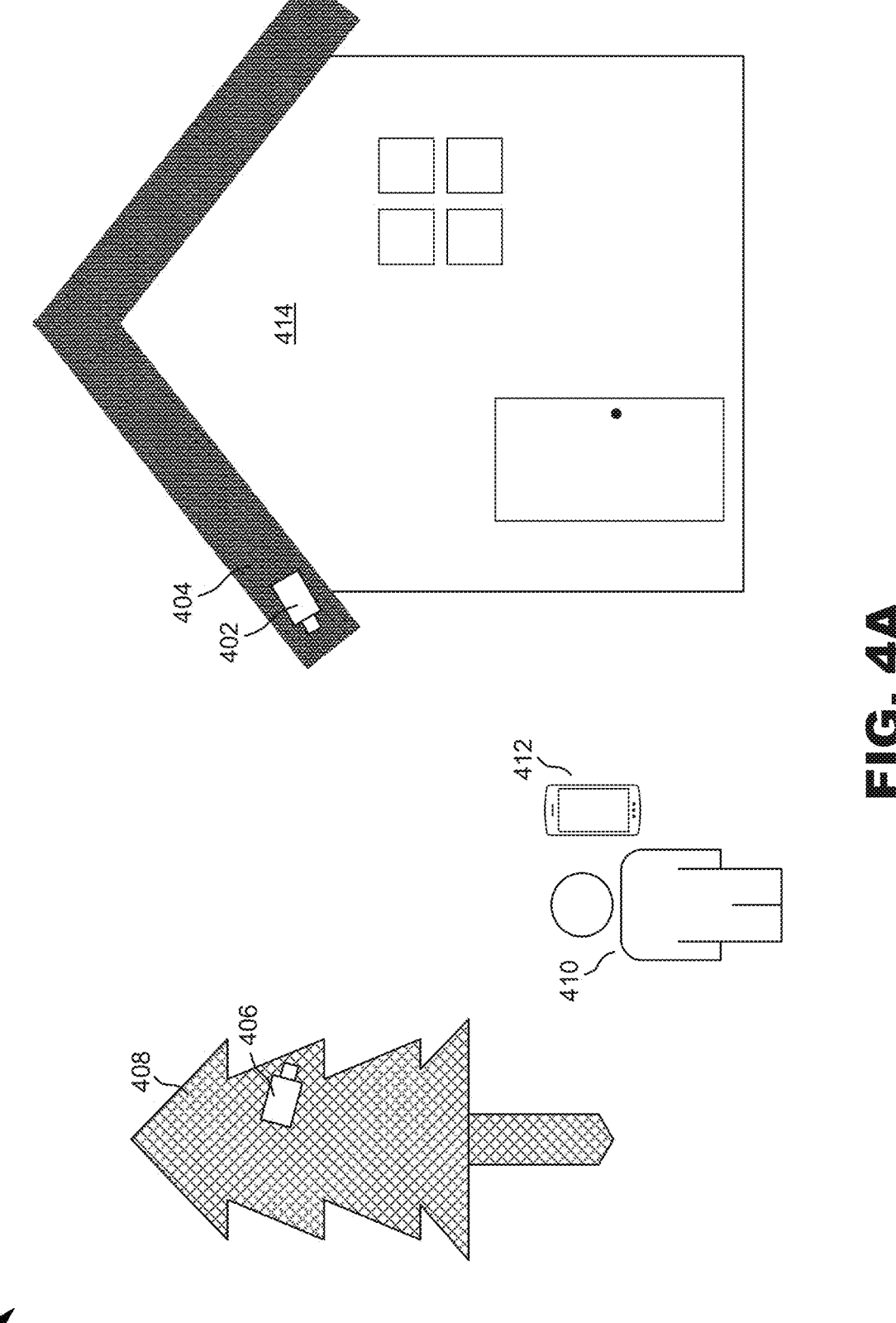
FIG. 4A and FIG. 4B illustrate an example of an environment that includes electronic devices that can be configured to have a different appearance, according to some aspects of the present disclosure.

FIG. 4A illustrates an example of an environment 400 that includes electronic devices that can be configured to have a different appearance. As illustrated, environment 400 includes camera 402 and camera 406 that can be configured to have a different appearance that can be used to affect (e.g., increase or reduce) the visibility of camera 402 and/or camera 406. In some examples, camera 402 and/or camera 406 can correspond to one of IoT devices 301 that can be configured to communicate with one or more servers (e.g., system servers 305), user devices (e.g., user device 307), networks (e.g., network 303), other IoT devices (e.g., IoT devices 301), and/or any other electronic device. In some cases, camera 402 and/or camera 406 can be part of a security or surveillance system and can be configured to capture and record image data and/or video data from environment 400.

In some aspects, camera 402 and/or camera 406 can have a housing, case, cover, surface, etc. that includes an external portion that can be configured to change in appearance. For example, camera 402 and/or camera 406 can include a housing or case that has at least one surface that can show an electronic image such as an emissive display (e.g., OLED, LED, etc.) and/or a non-emissive display (e.g., LCD, e-paper, etc.). Alternatively, or in addition, camera 402 and/or camera 406 can include a housing or case that has at least one surface that includes a material that can change in color or appearance such as an electrochromic material (e.g., color changing paint, chameleonic fabric, etc.), an electroluminescent material, any other type of material that can change appearance, and/or any combination thereof. Alternatively, or in addition, camera 402 and/or camera 406 can include a housing or case that has at least one surface configured to display an image that is generated by a projective display, which may be integrated with camera 402 and/or camera 406 or may be an external projective display.

In some instances, an electronic device that is self-powered (e.g., battery powered) may have a different type of display or appearance-changing material than an electronic device that is wired to a power source. For example, camera 402 may be wired to a power source from house 414 and utilize an emissive display that can continuously consume power while camera 406 may be battery powered and utilize a non-emissive display (e.g., electronic ink) that has reduced power consumption after it is configured.

In some cases, the appearance of camera 402 and/or camera 406 can be configured based on aesthetics (e.g., desired or preferred color), deterrence (e.g., color or appearance that increases visibility of camera to deter intruders), secrecy (e.g., color or appearance that camouflages device), etc. For example, the appearance of camera 402 and/or camera 406 can be configured to provide contrast with its surroundings (e.g., background and/or environment) such that camera 402 and/or camera 406 has increased visibility. In one illustrative example, camera 402 can be configured to have a bright yellow color that increases its visibility when mounted on surface 404 of house 414. In another example, camera 406 can be configured to have a white color that increases its visibility when mounted on tree 408.

Figure 4B:
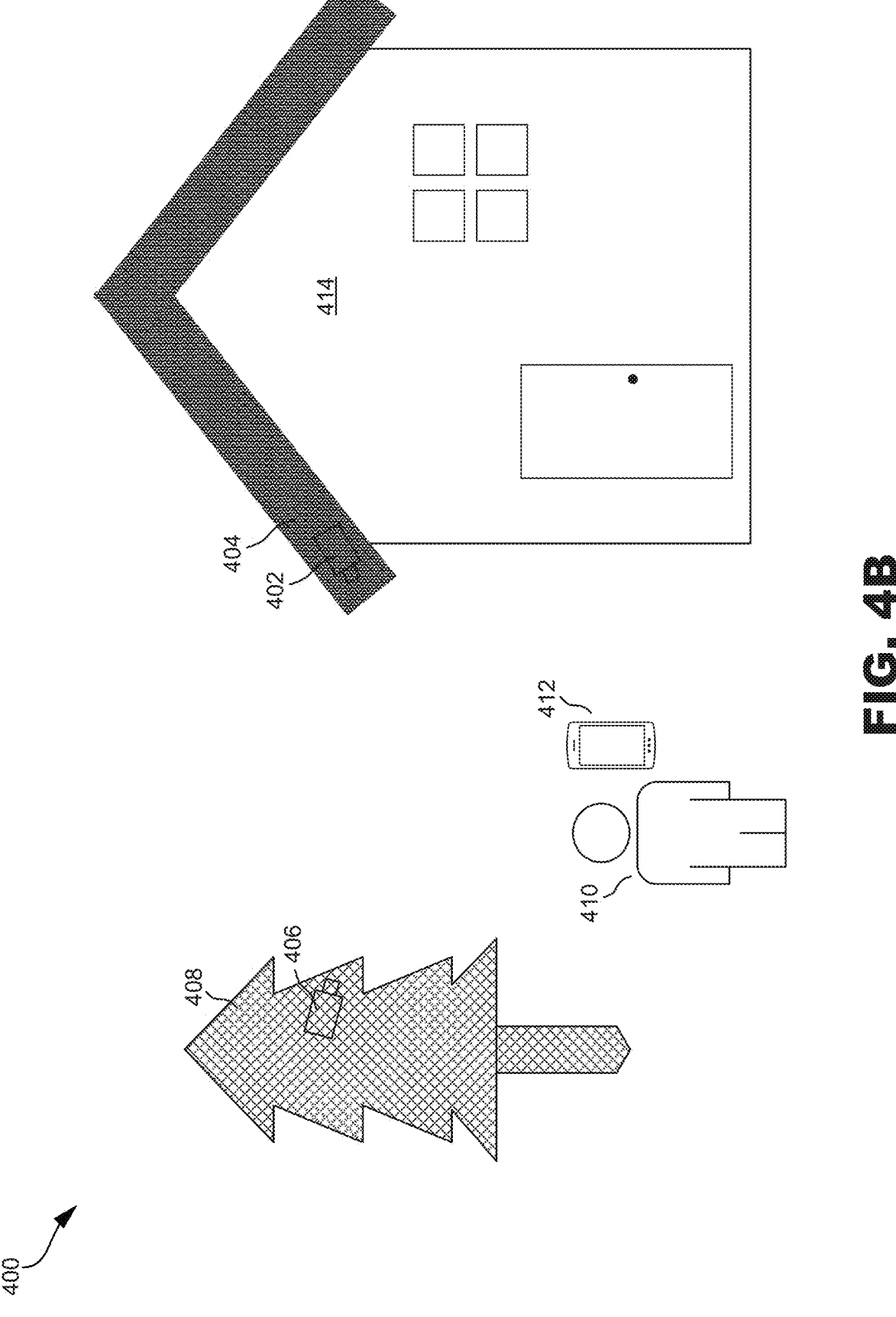

In some aspects, the appearance of camera 402 and/or camera 406 can be configured to adapt and blend in with its surroundings (e.g., background and/or environment) such that camera 402 and/or camera 406 is camouflaged or has reduced visibility. For example, as illustrated in FIG. 4B, camera 402 can be configured to have an appearance that is the same or similar to surface 404 such that visibility of camera 402 is reduced (e.g., camera 402 is camouflaged or obfuscated from view). In another example that is illustrated in FIG. 4B, camera 406 can be configured to have an appearance that is the same or similar to tree 408 such that visibility of camera 406 is reduced (e.g., camera 406 is camouflaged or obfuscated from view).

In some examples, camera 402 and/or camera 406 can be configured to appear as a different object. That is, camera 402 and/or camera 406 can use a display such that it is explicitly repainted and depicts a different object/thing. For instance, camera 402 and/or camera 406 can be configured to appear as a speaker, a light fixture, a bird house, a nest, and/or any other object that may be found within the environment 400. In another example, camera 402 and/or camera 406 can be configured to appear as a pack of playing cards, a box of tissues, a trophy, a picture frame, or any other object/thing. In some cases, such a configuration can be used to hide or obfuscate camera 402 and/or camera 406 in different settings (e.g., by mimicking common objects in kitchen, bathroom, living room, office, etc.).

Returning to FIG. 4A, in some aspects, user 410 can use a device such as smartphone 412 to configure the appearance of camera 402 and/or camera 406. For example, user 410 can use smartphone 412 to send a command to camera 402 and/or camera 406 to display an image or to change colors.

In some aspects, user 410 can use smartphone 412 to capture image data (e.g., picture and/or video) of an area that includes camera 402 and/or camera 406. In some instances, smartphone 412 can process the image data to determine appearance or visibility settings (e.g., visibility configuration) for camera 402 and/or camera 406. In other examples, smartphone 412 can send the image data to another device that can be configured to process the image data to determine appearance or visibility settings. For instance, the image data can be sent back to camera 402 and/or camera 406 for processing and/or it can be sent to a server (e.g., system servers 126) or to any other computing device that can be configured to process the image data.

In some cases, smartphone 412, camera 402, and/or camera 406 can process the image data to determine a color for camera 402 that causes camera 402 to blend in with surface 404. In another example, smartphone 412 camera 402, and/or camera 406 can process the image data to determine a pattern or image that can be presented on a display surface of camera 402 that causes camera 402 to blend in with surface 404. In further examples, smartphone 412, camera 402, and/or camera 406 can process the image data to determine an image, pattern, color, etc. that causes camera 402 and/or camera 406 to have an appearance that is aesthetically pleasing to user 410 or to have an appearance that stands out from its surroundings.

In some configurations, smartphone 412, camera 402, and/or camera 406 can include one or more machine learning models (e.g., artificial intelligence) that can be used to process image data and determine a visibility configuration for camera 402 and/or camera 406. For example, a machine learning model can be trained to process image data in order to generate an image, pattern, color, etc. that can be displayed on an external surface of camera 402 (e.g., to cause camera 402 to blend in with surface 404).

In some examples, smartphone 412 can perform an iterative process in which additional image data is captured after changing the appearance of camera 402 and/or camera 406. That is, smartphone 412 can continue to process image data to determine updated settings for modifying the appearance of camera 402 and/or camera 406 in order to reduce its visibility (e.g., improve camouflage). In some aspects, smartphone 412 may use the image data to determine a visibility score for camera 402 and/or camera 406. For instance, a lower visibility score may indicate that camera 402 and/or camera 406 would be difficult to detect while a higher visibility score may indicate that camera 402 and/or camera 406 can be easily seen. In some examples, the visibility score can be recalculated after making any change to the visibility configuration. In some instances, smartphone 412 may implement a feedback loop in which the visibility configuration of camera 402 and/or camera 406 is tweaked or modified until the visibility score is optimized.

In some aspects, user 410 may interact with smartphone 412 (e.g., via a software application) to configure or modify the visibility configuration for camera 402 and/or camera 406. For instance, user 410 can use an application on smartphone 412 to modify the image data and/or preview the effect of any changes on the appearance of camera 402 and/or camera 406. The user 410 can use smartphone 412 to modify or select settings related to color, contrast, brightness, etc. In some examples, the application on smartphone 412 may enable user 410 to save different visibility configurations for different devices and/or different scenarios. For instance, the visibility configuration can be customized based on time of day, season, weather, temperature, lighting conditions, etc.

In some examples, camera 406 can be configured to capture image data that includes camera 402. Alternatively, or in addition, camera 402 can be configured to capture image data that includes camera 406. That is, in some cases, visibility configuration can be performed using a camera that has another camera within its field of view. For instance, as noted with respect to smartphone 412, camera 406 can capture and process image data that includes camera 402 in order to determine a visibility configuration for camera 402. Similarly, camera 402 can capture and process image data that includes camera 406 in order to determine a visibility configuration for camera 406.

In some cases, the image data captured by camera 402 and/or camera 406 can be sent to one or more other devices that can be configured to process the image data. For example, the image data can be sent to another camera (e.g., camera 402 can send image data to camera 406). In another example, the image data can be sent to a device associated with a user (e.g., camera 402 can send image data to smartphone 412). In another example, the image data can be sent to a server (e.g., camera 402 can send image data to system servers 126).

In some aspects, visibility configuration can be performed as part of an initial setup for camera 402 and/or camera 406. In some aspects, visibility configuration can be performed periodically or continuously. For example, camera 406 may be configured to capture and process image data that includes camera 402 every 6 hours so that the visibility configuration for camera 402 can be updated (e.g., four different configurations in a 24-hour period). In some cases, an update to the visibility configuration may be triggered by a detected condition. For instance, camera 402 may determine that lighting conditions have changed (e.g., cloudy day) which can prompt camera 402 to capture image data that includes camera 406 in order to determine an updated visibility configuration (e.g., update color, image, pattern, etc. to modify visibility of camera 406).

In some examples, the visibility configuration of a device can be enabled or disabled based on the location of the device. For instance, camera 402 and/or camera 406 can be associated (e.g., registered to operate) with house 414. In some aspects, camera 402 and/or camera 406 may enable low visibility mode (e.g., camouflage features) when it is located within a threshold distance (e.g., 100 feet) of house 414. In some cases, camera 402 and/or camera 406 may disable low visibility mode (e.g., camouflage features) if they are located greater than a threshold distance (e.g., 200 feet) from house 414. In some instances, disabling the ability to cloak or camouflage may prevent unauthorized placement of devices (e.g., installing a cloaked or camouflaged camera at a neighbor's home).

In some cases, camera 402 and/or camera 406 can be configured to implement active camouflaging. In some instances, active camouflaging can include altering the visibility configuration based on one or more factors within environment 400 (e.g., decision guided visibility configuration). For example, camera 402 and/or camera 406 can implement a visibility configuration that camouflages camera 402 and/or camera 406 based on the time of day. In another example, camera 402 and/or camera 406 may alter the visibility configuration based on the detection of different people in environment 400. For instance, camera 402 and/or camera 406 may disable a visibility configuration the camouflages the respective device based on the presence of an authorized user such as user 410. In another example, camera 402 and/or camera 406 may make itself visible based on detection of law enforcement personnel (e.g., machine learning algorithm identifies police car or police officer). In another example, camera 402 and/or camera 406 may make itself visible based on noise detection (e.g., change appearance in response to threshold change in ambient sound level).

In some aspects, camera 402 and/or camera 406 may correspond to a camera that has the ability to rotate or pan. For example, camera 402 can be configured to rotate such that the area including camera 406 is within its field of view. In another example, camera 406 can be configured to rotate such that the area including camera 402 is within its field of view. In some cases, camera 402 and/or camera 406 can be configured to rotate and capture image data of the area surrounding itself. For instance, camera 402 can be configured to rotate and capture image data that includes surface 404 and/or camera 406 can be configured to rotate and capture image data that includes tree 408. In some examples, a camera can use the image data that it captures of its surrounding area to determine a visibility configuration. For instance, camera 402 can stitch together multiple images of surface 404 to determine a visibility configuration that causes camera 402 to blend in with surface 404.

Figure 5B:
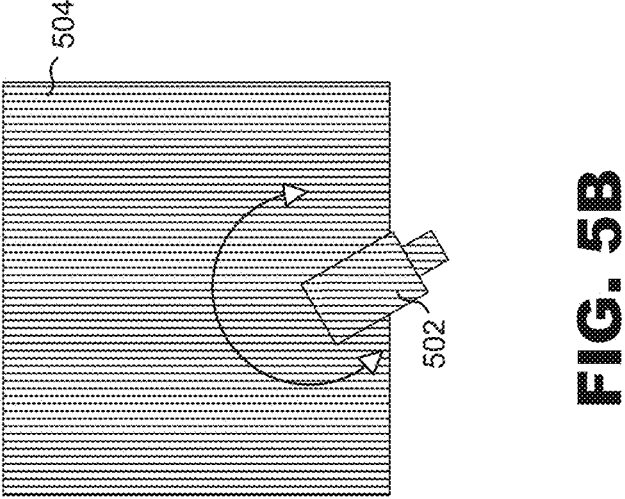
FIG. 5A and FIG. 5B illustrate an example of an electronic device that can be configured to have a different appearance, according to some aspects of the present disclosure.
Figure 5A:
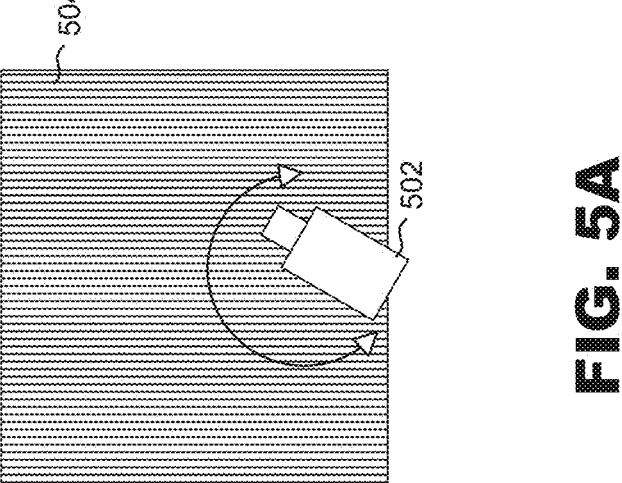

FIG. 5A illustrates an example of a camera 502 that can be configured to rotate and capture image data of its surroundings. For example, camera 502 can change positions such that it captures image data corresponding to surface 504. Camera 502 can process the image data to determine color(s), pattern(s), image(s), etc. that can be used to configure the appearance of camera 502 such that it blends in with surface 504. That is, as noted above with respect to camera 402 and camera 406, camera 502 can include a housing or case having at least one surface with a display (e.g., emissive display, non-emissive display, etc.), an electrochromic material, an electroluminescent material, etc. that can be configured to change the appearance of camera 502.

FIG. 5B illustrates camera 502 with a visibility configuration that is intended to blend in with surface 504. In some aspects, camera 502 can continue to capture image data corresponding to its surroundings (e.g., surface 504) and update the visibility configuration accordingly. In some cases, camera 502 may receive the visibility configuration from another electronic device such as a user device (e.g., smartphone, tablet, laptop, etc.), a server, another camera, etc.

Figure 6:
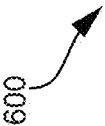
FIG. 6 illustrates an example of an environment that includes an electronic device having an obfuscated appearance and configured to generate alerts based on detected activity, according to some aspects of the present disclosure.

FIG. 6 illustrates an example of an environment 600 that includes an electronic device having an obfuscated appearance and is configured to generate alerts based on detected activity. As illustrated, environment 600 includes camera 602 that has been configured to have an appearance that blends in with surface 604 on house 606. That is, as noted above with respect to camera 402 and camera 406, camera 602 includes a housing or case having a display or material that can be used to modify the appearance of camera 602.

In some aspects, camera 602 may detect the presence of person 608. In some cases, camera 602 may process image data the includes person 608 to determine that person 608 is an unknown person. For example, camera 602 can use facial recognition techniques to determine that person 608 is not within a database of known individuals that are associated with house 606. In some examples, camera 602 may process image data that includes person 608 to determine that person 608 is directing their view towards camera 602. That is, camera 602 can determine (based on image data) that person 608 has detected the presence of camera 602.

In some examples, camera 602 may determine that camera 602 is detectable because it is being viewed by person 608. That is, camera 602 may determine that it is detectable because it is visible to an individual that is not associated with house 606 (e.g., a person different than the person that performed the instillation or configuration of camera 602). In some aspects, camera 602 may revise its visibility score based on detection by person 608. In some instances, camera 602 can gather or request new image data in order to repeat the process of camouflaging itself.

In some aspects, camera 602 may generate one or more alerts (e.g., alert 610) based on detected activity. For instance, in response to determining that person 608 is an unknown person, camera 602 may send alert 610 to a device associated with an authorized user (e.g., smartphone 412) that indicates presence of an unauthorized user. In some cases, alert 610 may also indicate that camera 602 may be visible to third parties so that the authorized user can revisit the appearance configuration of camera 602. In some examples, the alert 610 can be sent to a service provider that monitors a security system associated with house 606.

In some examples, alert 610 can include changing the appearance of camera 602. For example, camera 602 may initiate a sequence of flashing bright colors that can inform person 608 of an ongoing recording. In some cases, alert 610 can include a notification (e.g., push notification) that is sent to one or more electronic devices within the vicinity of camera 602. For instance, alert 610 can include a notification to device 612 that is associated with person 608. In some examples, the notification can include an image or video of person 608. In some aspects, the alert 610 (e.g., notification) can be sent using a wireless protocol such as Bluetooth, WiFi, RFID, 5G, and/or any other communications protocol.

Figure 7B:
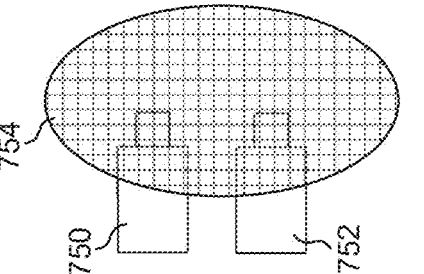
FIG. 7A and FIG. 7B illustrate examples of electronic devices that can be hidden using a obfuscating barrier, according to some aspects of the present disclosure.
Figure 7A:
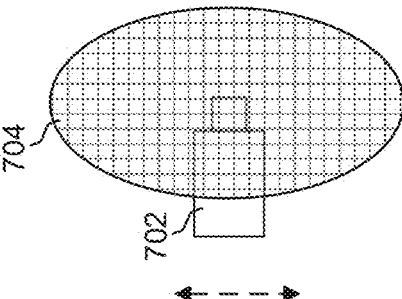

FIG. 7A illustrates an example of an electronic device that is hidden using an obfuscating barrier. In some aspects, the electronic device can include an image sensor 702 that is positioned behind the obfuscating barrier 704. In some cases, the obfuscating barrier 704 can correspond to a mesh panel.

In some examples, the image sensor 702 can be configured to move or vibrate will capturing image data so that it can process the image data can remove diffraction caused by the obfuscating barrier 704. In one illustrative example, image sensor 702 can be coupled to a voice coil that transfers a motive force to the image sensor 702.

In some examples, the obfuscating barrier 704 may include a display and/or a material that can be used to change the appearance of the obfuscating barrier 704. For instance, the obfuscating barrier 704 can include an electrochromic material that changes colors such that the obfuscating barrier can blend in with a surrounding environment.

FIG. 7B illustrates another example of an electronic device that is hidden using an obfuscating barrier. In some aspects, the electronic device can include two or more image sensors such as image sensor 750 and image sensor 752 that are positioned behind the obfuscating barrier 754. In some cases, the obfuscating barrier 754 can correspond to a mesh panel. In some aspects, the image data captured by image sensor 750 and image sensor 752 can be processed to filter out the obfuscating barrier 754. As noted with respect to obfuscating barrier 704, the obfuscating barrier 754 can also be configured to include a display and/or materials that can be used to change the appearance of obfuscating barrier 754.

FIG. 8 is a flowchart for a method 800 for configuring the appearance of an electronic device. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 4A, FIG. 4B, FIG. 5A, FIG. 5B, and FIG. 6. However, method 800 is not limited to those examples.

In step 802, the method 800 includes obtaining a visibility configuration for altering an appearance of an exterior surface of a first electronic device. For example, camera 402 can obtain a visibility configuration for altering an appearance of an exterior surface of camera 402. In some aspects, the visibility configuration can include image data of an area that includes the first electronic device. For instance, the visibility configuration can include image data of an area that includes camera 402 and surface 404.

In some examples, obtaining the visibility configuration can include receiving the visibility configuration from a second electronic device that is associated with the first electronic device. For instance, camera 402 can receive the visibility configuration from smartphone 412 and/or from camera 406.

In step 804, the method 800 includes modifying at least a portion of the exterior surface of the first electronic device based on the visibility configuration. In some cases, the exterior surface of the first electronic device can include at least one of an emissive display, a non-emissive display, an electrochromic material, and an electroluminescent material. For example, camera 402 can modify at least a portion of an exterior surface (e.g., emissive display, non-emissive display, etc.) based on the visibility configuration. In some cases, modifying the portion of the exterior surface can include adapting the portion of the exterior surface of the first electronic device based on the image data to obfuscate visibility of the first electronic device. For example, as illustrated in FIG. 4B, camera 402 can adapt its exterior surface to blend in with surface 404 and obfuscate visibility of camera 402.

In some aspects, the first electronic device can correspond to a rotating camera, and the visibility configuration can include image data captured while adjusting a field of view of the rotating camera. For example, camera 402 can correspond to camera 502, which can rotate to adjust its field of view and capture image data that includes surface 504.

In some examples, the method 800 can include receiving a revised visibility configuration from a second electronic device, wherein the second electronic device is configured to determine a visibility score for the first electronic device; and modifying the portion of the exterior surface of the first electronic device based on the revised visibility configuration. For instance, camera 402 can receive a revised visibility configuration from smartphone 412 and modify the appearance of camera 402 based on the revised visibility configuration.

In some cases, the method 800 can include capturing image data that includes at least one unauthorized user directing their view toward the first electronic device and determining, based on the image data, that the first electronic device is visible to the at least one unauthorized user. For example, camera 602 can capture image data that includes person 608 directing their view toward camera 602 and camera 602 can determine that camera 602 is visible to person 608.

In some aspects, the method 800 can include generating an alert that indicates presence of a video recording device to the at least one unauthorized user. For instance, camera 602 can generate alert 610 that indicates presence of camera 602 to person 608.

In some cases, the method 800 can include sending a visibility notification to a user device associated with an authorized user, wherein the visibility notification indicates that the first electronic device is not camouflaged. For example, camera 602 can send alert 610 (e.g., that includes a visibility notification) to smartphone 412 to indicate that camera 602 has increased visibility (e.g., not camouflaged).

FIG. 9 is a flowchart for a method 900 for configuring the appearance of an electronic device. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 4A. However, method 900 is not limited to that example.

In step 902, the method 900 includes capturing at least one image corresponding to an area that includes an electronic device. For example, smartphone 412 can capture at least one image of an are that includes camera 402.

In step 904, the method 900 includes determining, based on the at least one image, a visibility configuration for altering an appearance of an exterior surface of the electronic device to obfuscate visibility of the electronic device within the area. For instance, smartphone 412 can determine, based on the image of the area that includes camera 402, a visibility configuration for altering an appearance of an exterior surface of camera 402 to reduce (e.g., obfuscate) visibility of camera 402. In some cases, the visibility configuration can include image, pattern, and/or color information that can be used to alter an exterior surface of camera 402.

In step 906, the method 900 includes sending the visibility configuration to the electronic device. For example, smartphone 412 can send the visibility configuration to camera 402.

Figure 10:
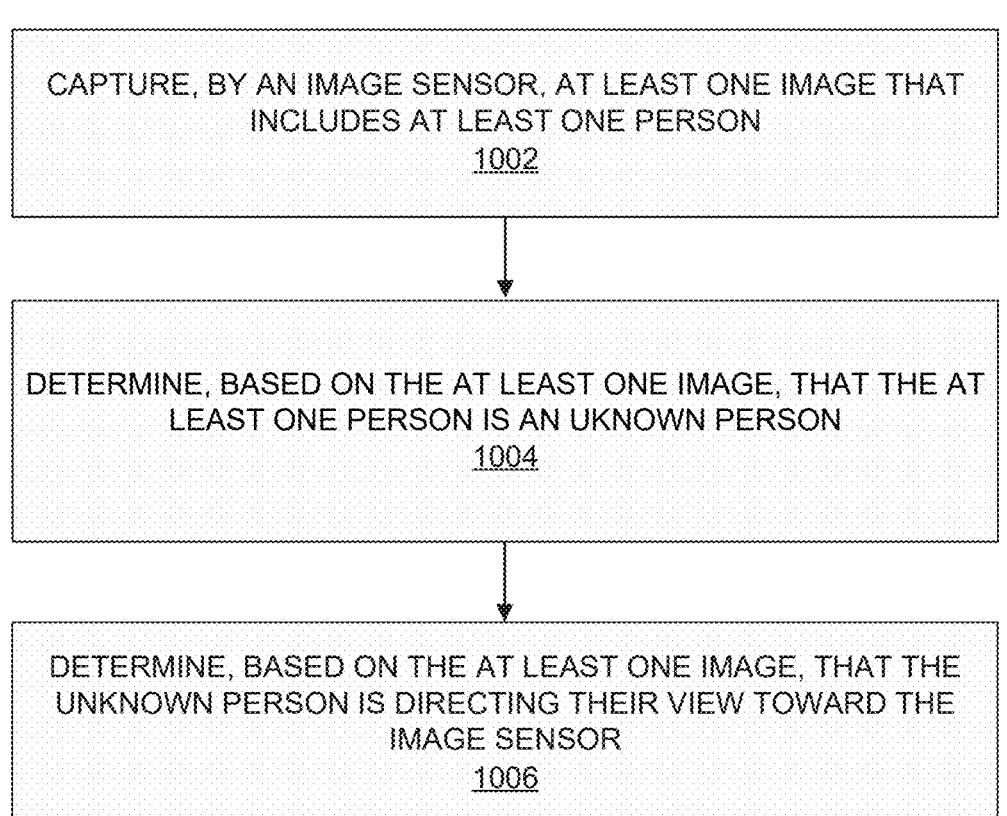
FIG. 10 is a diagram illustrating a flowchart of an example method for detecting activity by an electronic device, according to some aspects of the present disclosure.

FIG. 10 is a flowchart for a method 1000 for configuring the appearance of an electronic device. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 6. However, method 1000 is not limited to that example.

In step 1002, the method 1000 includes capturing, by an image sensor, at least one image that includes at least one person. For example, camera 602 can capture an image that includes person 608.

In step 1004, the method 1000 includes determining, based on the at least one image, that the at least one person is an unknown person. For instance, camera 602 can determine, based on the image data, that person 608 is unknown or unauthorized (e.g., using facial recognition and based on a database of authorized people associated with house 606). In some cases, camera 602 may send the image data to a server that can perform the image processing (e.g., server can perform the facial recognition and determine whether person 608 is unknown).

In step 1006, the method 1000 includes determining, based on the at least one image, that the unknown person is directing their view toward the image sensor. For instance, camera 602 can determine, based on the image data, that person 608 is directing their view toward camera 602. In some cases, camera 602 can determine that the current appearance settings for reducing visibility need to be modified because an unknown individual has identified the presence of camera 602.

In some examples, camera 602 may send an alert (e.g., alert 610) to an authorized user to alert the authorized user of the presence of person 608. In some aspects, the alert 610 may also indicate that the visibility of camera 602 has been compromised (e.g., camera 602 is visible). In some cases, the alert 610 can include a visual alert (e.g., blinking lights) that is visible to person 608. In some instances, the alert 610 can include a wireless transmission that is sent to multiple devices including device 612 that is associated with person 608.

Figure 11:
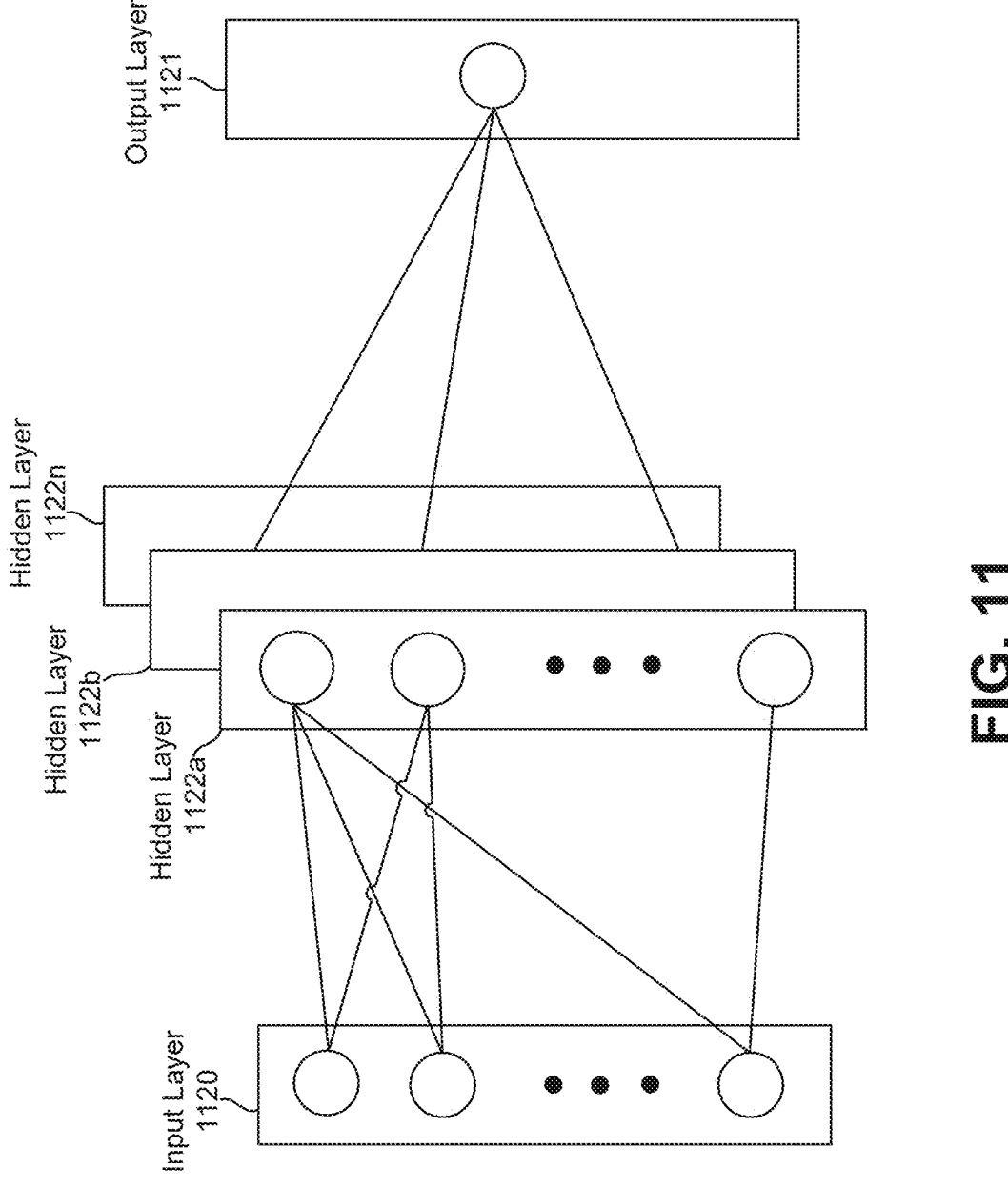
FIG. 11 is a diagram illustrating an example of a neural network architecture, according to some examples of the present disclosure.

FIG. 11 is a diagram illustrating an example of a neural network architecture 1100 that can be used to implement some or all of the neural networks described herein. The neural network architecture 1100 can include an input layer 1120 can be configured to receive and process data to generate one or more outputs. For example, input layer 1120 can be configured to receive image data (e.g., picture and/or video) of an area that includes an electronic device. The neural network architecture 1100 also includes hidden layers 1122a, 1122b, through 1122n. The hidden layers 1122a, 1122b, through 1122n include "n" number of hidden layers, where "n" is an integer greater than or equal to one. The number of hidden layers can be made to include as many layers as needed for the given application. The neural network architecture 1100 further includes an output layer 1121 that provides an output resulting from the processing performed by the hidden layers 1122a, 1122b, through

1122n. For instance, the output layer 1121 can include a visibility configuration that can be used to adjust the appearance of the electronic device based on its surroundings (e.g., to increase or decrease visibility of the electronic device).

The neural network architecture 1100 is a multi-layer neural network of interconnected nodes. Each node can represent a piece of information. Information associated with the nodes is shared among the different layers and each layer retains information as information is processed. In some cases, the neural network architecture 1100 can include a feed-forward network, in which case there are no feedback connections where outputs of the network are fed back into itself. In some cases, the neural network architecture 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122a. For example, as shown, each of the input nodes of the input layer 1120 is connected to each of the nodes of the first hidden layer 1122a. The nodes of the first hidden layer 1122a can transform the information of each input node by applying activation functions to the input node information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1121, at which an output is provided. In some cases, while nodes in the neural network architecture 1100 are shown as having multiple output lines, a node can have a single output and all lines shown as being output from a node represent the same output value.

In some cases, each node or interconnection between nodes can have a weight that is a set of parameters derived from the training of the neural network architecture 1100. Once the neural network architecture 1100 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 1100 to be adaptive to inputs and able to learn as more and more data is processed.

The neural network architecture 1100 is pre-trained to process the features from the data in the input layer 1120 using the different hidden layers 1122a, 1122b, through 1122n in order to provide the output through the output layer 1121.

In some cases, the neural network architecture 1100 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 1100 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as E_total=Σ(½ (target−output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 1100 can perform a backward pass by determining which inputs (weights) most contributed to the loss of the network, and can adjust the weights so that the loss decreases and is eventually minimized.

The neural network architecture 1100 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 1100 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 12:
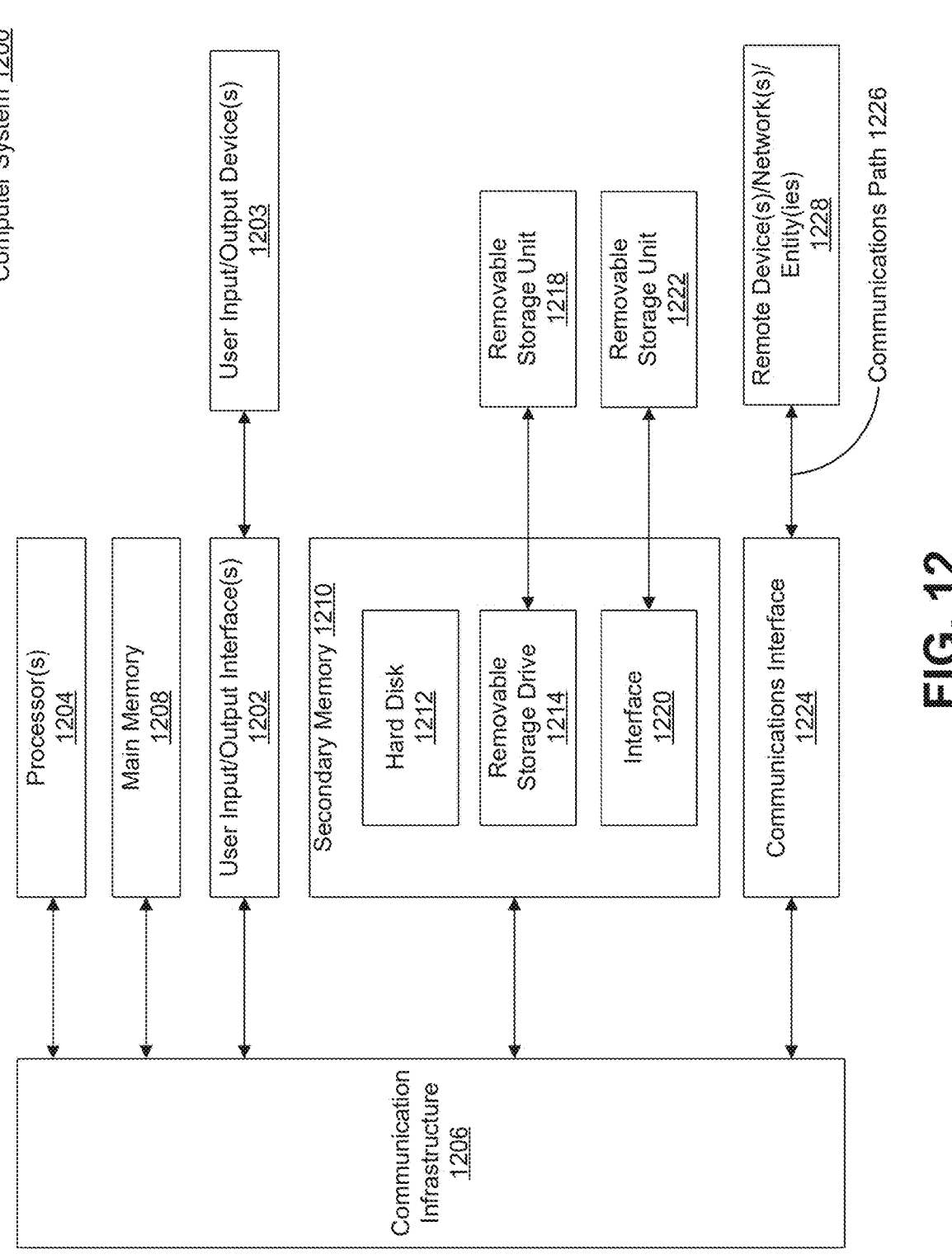
FIG. 12 illustrates an example computer system that can be used for implementing various aspects of the present disclosure.

Various aspects and examples may be implemented, for example, using one or more well-known computer systems, such as computer system 1200 shown in FIG. 12. For example, the media device 106 may be implemented using combinations or sub-combinations of computer system 1200. Also or alternatively, one or more computer systems 1200 may be used, for example, to implement any of the aspects and examples discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include user input/output device(s) 1203, such as monitors, keyboards, pointing devices, etc., which may communicate with communication infrastructure 1206 through user input/output interface(s) 1202.

One or more of processors 1204 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (e.g., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1200 may include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system xx00 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200 or processor(s) 1204), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A first electronic device comprising: one or more memories; and at least one processor coupled to at least one of the one or more memories and configured to perform operations comprising: obtain a visibility configuration for altering an appearance of an exterior surface of the first electronic device; and modify at least a portion of the exterior surface of the first electronic device based on the visibility configuration.

Aspect 2. The first electronic device of Aspect 1, wherein to obtain the visibility configuration the at least one processor is configured to perform operations comprising: receive the visibility configuration from a second electronic device that is associated with the first electronic device.

Aspect 3. The first electronic device of any of Aspects 1 to 2, wherein the visibility configuration includes image data of an area that includes the first electronic device.

Aspect 4. The first electronic device of Aspect 3, wherein to modify the portion of the exterior surface the at least one processor is configured to perform operations comprising: adapt the portion of the exterior surface of the first electronic device based on the image data to obfuscate visibility of the first electronic device within the area.

Aspect 5. The first electronic device of any of Aspects 1 to 4, wherein the at least one processor is configured to perform operations comprising: receive a revised visibility configuration from a second electronic device, wherein the second electronic device is configured to determine a visibility score for the first electronic device; and modify the portion of the exterior surface of the first electronic device based on the revised visibility configuration.

Aspect 6. The first electronic device of any of Aspects 1 to 5, wherein the at least one processor is configured to perform operations comprising: capture image data that includes at least one unauthorized user directing their view toward the first electronic device; and determine, based on the image data, that the first electronic device is visible to the at least one unauthorized user.

Aspect 7. The first electronic device of Aspect 6, wherein the at least one processor is configured to perform operations comprising: generate an alert that indicates presence of a video recording device to the at least one unauthorized user.

Aspect 8. The first electronic device of Aspects 6, wherein the at least one processor is configured to perform operations comprising: send a visibility notification to a user device associated with an authorized user, wherein the visibility notification indicates that the first electronic device is not camouflaged.

Aspect 9. The first electronic device of any of Aspects 1 to 8, wherein the first electronic device corresponds to a rotating camera, and wherein the visibility configuration includes image data captured while adjusting a field of view of the rotating camera.

Aspect 10. The first electronic device of any of Aspects 1 to 9, wherein the exterior surface of the first electronic device includes at least one of an emissive display, a non-emissive display, an electrochromic material, and an electroluminescent material.

Aspect 11. A computer-implemented method comprising: obtaining a visibility configuration for altering an appearance of an exterior surface of a first electronic device; and modifying at least a portion of the exterior surface of the first electronic device based on the visibility configuration.

Aspect 12. The computer-implemented method of Aspect 11, wherein obtaining the visibility configuration further comprises: receiving the visibility configuration from a second electronic device that is associated with the first electronic device.

Aspect 13. The computer-implemented method of any of Aspects 11 to 12, wherein the visibility configuration includes image data of an area that includes the first electronic device.

Aspect 14. The computer-implemented method of Aspect 13, wherein modifying the portion of the exterior surface further comprises: adapting the portion of the exterior surface of the first electronic device based on the image data to obfuscate visibility of the first electronic device within the area.

Aspect 15. The computer-implemented method of any of Aspects 11 to 14, further comprising: receiving a revised visibility configuration from a second electronic device, wherein the second electronic device is configured to determine a visibility score for the first electronic device; and modifying the portion of the exterior surface of the first electronic device based on the revised visibility configuration.

Aspect 16. The computer-implemented method of any of Aspects 11 to 15, further comprising: capturing image data that includes at least one unauthorized user directing their view toward the first electronic device; and determining, based on the image data, that the first electronic device is visible to the at least one unauthorized user.

Aspect 17. The computer-implemented method of Aspect 16, further comprising: generating an alert that indicates presence of a video recording device to the at least one unauthorized user.

Aspect 18. The computer-implemented method of Aspect 16, further comprising: sending a visibility notification to a user device associated with an authorized user, wherein the visibility notification indicates that the first electronic device is not camouflaged.

Aspect 19. The computer-implemented method of any of Aspects 11 to 18, wherein the exterior surface of the first electronic device includes at least one of an emissive display, a non-emissive display, an electrochromic material, and an electroluminescent material.

Aspect 20. A non-transitory computer-readable medium having instructions stored thereon that, when executed by at least one computing device, cause the at least one computing device to perform a method according to any of Aspects 11 to 19.

Aspect 21. A system comprising means for performing a method according to any of Aspects 11 to 19.

What is claimed is:

1. A system comprising:

one or more memories; and at least one processor coupled to the one or more memories and configured to perform operations comprising:

determining whether to initiate or terminate a reduced-visibility mode of an electronic device based on at least one of an environmental context of the electronic device, sound detected in a physical environment of the electronic device, a user detected in a scene of the electronic device, and an identity of the user, wherein the reduced-visibility mode comprises a display setting that modifies an appearance of the electronic device based on a visual output estimated to reduce an appearance-based visibility of the electronic device in the physical environment, relative to the appearance-based visibility of the electronic device corresponding to the appearance of the electronic device without the visual output, wherein the visual output is estimated to reduce the appearance-based visibility of the electronic device based on a first visibility metric associated with the appearance of the electronic device modified by the visual output and a second visibility metric associated with the appearance of the electronic device without the visual output, the first visibility metric and the second visibility metric being based on image data depicting the scene;

in response to determining to initiate the reduced-visibility mode, determining the visual output based on one or more features extracted from the image data corresponding to at least a portion of the scene, the visual output comprising a visual pattern associated with a similarity metric indicating a visual similarity between visual attributes of the visual pattern and the portion of the scene, wherein the similarity metric is based on the one or more features extracted from the image data; and in response to initiating the reduced-visibility mode, modifying the appearance of the electronic device based on the visual output, wherein the visual output is displayed on a display of the electronic device.

2. The system of claim 1, wherein the environmental context of the electronic device comprises at least one of the scene of the electronic device, one or more lighting conditions in the scene or physical environment of the electronic device, and one or more weather conditions in the physical environment of the electronic device, the physical environment of the electronic device comprising at least one of a location of the electronic device.

3. The system of claim 1, wherein the one or more features extracted from the image data comprise one or more visual features of the scene, and wherein the visual output is based on the one or more visual features of the scene and a surface of the electronic device.

4. The system of claim 3, wherein determining whether to initiate or terminate the reduced-visibility mode of the electronic device comprises:

determining the appearance of a surface of the electronic device and an appearance of one or more elements of the scene depicted in the image data, the one or more elements comprising at least one of an object in the scene, a background of the scene, and a color of a depicted surface in the scene;

based on the appearance of the surface of the electronic device and the appearance of the one or more elements of the scene, determining one or more modifications to the appearance of the surface of the electronic device, the one or more modifications to the appearance of the surface of the electronic device comprising a modification to at least one of an optical contrast, a visual pattern, a texture, a color, and a brightness of the surface of the electronic device; and determining the visual output based on the one or more modifications to the appearance of the surface of the electronic device.

5. The system of claim 1, wherein the at least one processor is configured to perform operations comprising:

determining a visibility score associated with the appearance-based visibility of the electronic device and a different visibility score based on the one or more features extracted from the image data and a revised visibility configuration of the electronic device, wherein the revised visibility configuration comprises a visibility configuration of the electronic device corresponding to a respective appearance of an exterior surface of the electronic device modified based on the visual output, and wherein modifying the appearance of the electronic device comprises modifying the respective appearance of the exterior surface of the electronic device based on the revised visibility configuration.

6. The system of claim 1, wherein the at least one processor is configured to perform operations comprising:

determining that the image data depicts a person in the scene; and determining, based on the image data, that the electronic device is within a view or field-of-view of the person in the scene.

7. The system of claim 6, wherein the at least one processor is configured to perform operations comprising:

in response to the determining that the electronic device is within the view or field-of-view of the person in the scene, determining to notify the person of a presence of a video recording device, the video recording device comprising the electronic device; and in response to determining to notify the person of the presence of the video recording device, generating an alert or sending a visibility notification to a user device associated with the person.

8. The system of claim 6, wherein the at least one processor is configured to perform operations comprising:

based on the person depicted in the scene and the determining that the electronic device is within the view or field-of-view of the person, terminating the reduced-visibility mode of the electronic device.

9. The system of claim 1, wherein the system comprises the electronic device and the electronic device comprises a rotating camera, and wherein the image data is captured by the rotating camera while adjusting a field of view of the rotating camera.

10. The system of claim 1, wherein the system comprises the electronic device and an exterior surface of the electronic device comprises at least one of an emissive display, a non-emissive display, an electrochromic material, and an electroluminescent material.

11. A computer-implemented method comprising:

determining whether to initiate or terminate a reduced-visibility mode of an electronic device based on at least one of an environmental context of the electronic device, sound detected in a physical environment of the electronic device, a user detected in a scene of the electronic device, and an identity of the user, wherein the reduced-visibility mode comprises a display setting that modifies an appearance of the electronic device based on a visual output estimated to reduce an appearance-based visibility of the electronic device in the physical environment, relative to the appearance-based visibility of the electronic device corresponding to the appearance of the electronic device without the visual output, wherein the visual output is estimated to reduce the appearance-based visibility of the electronic device based on a first visibility metric associated with the appearance of the electronic device modified by the visual output and a second visibility metric associated with the appearance of the electronic device without the visual output, the first visibility metric and the second visibility metric being based on image data depicting the scene;

in response to determining to initiate the reduced-visibility mode, determining the visual output based on one or more features extracted from the image data corresponding to at least a portion of the scene, the visual output comprising a visual pattern associated with a similarity metric indicating a visual similarity between visual attributes of the visual pattern and the portion of the scene, wherein the similarity metric is based on the one or more features extracted from the image data; and in response to initiating the reduced-visibility mode, modifying the appearance of the electronic device based on the visual output, wherein the visual output is displayed on a display of the electronic device.

12. The computer-implemented method of claim 11, wherein the environmental context of the electronic device comprises at least one of the scene of the electronic device, one or more lighting conditions in the scene or physical environment of the electronic device, and one or more weather conditions in the physical environment of the electronic device, the physical environment of the electronic device comprising at least one of a location of the electronic device.

13. The computer-implemented method of claim 11, wherein the one or more features extracted from the image data comprise one or more visual features of the scene, and wherein the visual output is based on the one or more visual features of the scene and a surface of the electronic device.

14. The computer-implemented method of claim 13, wherein determining whether to initiate or terminate the reduced-visibility mode of the electronic device comprises:

determining the appearance of a surface of the electronic device and an appearance of one or more elements of the scene depicted in the image data, the one or more elements comprising at least one of an object in the scene, a background of the scene, and a color of a depicted surface in the scene;

based on the appearance of the surface of the electronic device and the appearance of the one or more elements of the scene, determining one or more modifications to the appearance of the surface of the electronic device, the one or more modifications to the appearance of the surface of the electronic device comprising a modification to at least one of an optical contrast, a visual pattern, a texture, a color, and a brightness of the surface of the electronic device; and determining the visual output based on the one or more modifications to the appearance of the surface of the electronic device.

15. The computer-implemented method of claim 11, further comprising:

receiving determining a visibility score associated with the appearance-based visibility of the electronic device and a different visibility score based on the one or more features extracted from the image data and a revised visibility configuration of the electronic device, wherein the revised visibility configuration comprises a visibility configuration of the electronic device corresponding to a respective appearance of an exterior surface of the electronic device modified based on the visual output, and wherein modifying the appearance of the electronic device comprise modifying the respective appearance of the exterior surface of the electronic device based on the revised visibility configuration.

16. The computer-implemented method of claim 11, further comprising:

determining that the image data depicts a person in the scene; and determining, based on the image data, that the electronic device is within a view or field-of-view of the person in the scene.

17. The computer-implemented method of claim 16, further comprising:

in response to the determining that the electronic device is within the view or field-of-view of the person in the scene, determining to notify the person of a presence of a video recording device, the video recording device comprising the electronic device; and in response to determining to notify the person of the presence of the video recording device, generating an alert or sending a visibility notification to a user device associated with the person.

18. The computer-implemented method of claim 16, further comprising:

based on the person depicted in the scene and the determining that the electronic device is within the view or field-of-view of the person, terminating the reduced-visibility mode of the electronic device.

19. The computer-implemented method of claim 11, wherein an exterior surface of the electronic device comprises at least one of an emissive display, a non-emissive display, an electrochromic material, and an electroluminescent material.

20. A non-transitory computer-readable medium having instructions stored thereon that, when executed by at least one computing device, cause the at least one computing device to perform operations comprising:

determining whether to initiate or terminate a reduced-visibility mode of an electronic device based on at least one of an environmental context of the electronic device, sound detected in a physical environment of the electronic device, a user detected in a scene of the electronic device, and an identity of the user, wherein the reduced-visibility mode comprises a display setting that modifies an appearance of the electronic device based on a visual output estimated to reduce an appearance-based visibility of the electronic device in the physical environment, relative to the appearance-based visibility of the electronic device corresponding to the appearance of the electronic device without the visual output, wherein the visual output is estimated to reduce the appearance-based visibility of the electronic device based on a first visibility metric associated with the appearance of the electronic device modified by the visual output and a second visibility metric associated with the appearance of the electronic device without the visual output, the first visibility metric and the second visibility metric being based on image data depicting the scene;

in response to determining to initiate the reduced-visibility mode, determining the visual output based on one or more features extracted from the image data corresponding to at least a portion of the scene, the visual output comprising a visual pattern associated with a similarity metric indicating a visual similarity between visual attributes of the visual pattern and the portion of the scene, wherein the similarity metric is based on the one or more features extracted from the image data; and in response to initiating the reduced-visibility mode, modifying the appearance of the electronic device based on the visual output, wherein the visual output is displayed on a display of the electronic device.

\* \* \* \* \*